(12) United States Patent
Inoue et al.

(10) Patent No.: US 6,798,733 B2
(45) Date of Patent: Sep. 28, 2004

(54) OPTICAL RECORDING METHOD AND MEDIUM

(75) Inventors: Hiroyasu Inoue, Chuo-ku (JP); Hajime Utsunomiya, Chuo-ku (JP); Tatsuya Kato, Chuo-ku (JP); Hiroshi Shingai, Chuo-ku (JP)

(73) Assignee: TDK Corporation, Tokyo (JP)

( * ) Notice: Subject to any disclaimer, the term of this patent is extended or adjusted under 35 U.S.C. 154(b) by 708 days.

(21) Appl. No.: 09/852,730

(22) Filed: May 11, 2001

(65) Prior Publication Data

US 2002/0001284 A1 Jan. 3, 2002

(30) Foreign Application Priority Data

| May 12, 2000 | (JP) | 2000-139538 |
| Aug. 9, 2000 | (JP) | 2000-241510 |
| Sep. 6, 2000 | (JP) | 2000-270339 |
| Apr. 6, 2001 | (JP) | 2001-109137 |

(51) Int. Cl.[7] .................................................. G11B 7/00
(52) U.S. Cl. ............................ 369/275.3; 369/112.23
(58) Field of Search .......................... 369/275.2, 275.3, 369/275.1, 275.4, 112.23

(56) References Cited

U.S. PATENT DOCUMENTS 6,735,165 B1 * 5/2004 Zhou et al. .............. 369/275.2

FOREIGN PATENT DOCUMENTS

| JP | 1-78444 | 3/1989 |
| JP | 7-262613 | 10/1995 |
| JP | 8-063784 | 3/1996 |
| JP | 10-326436 | 12/1998 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

When information is recorded in an optical recording medium having a recording layer by irradiating a laser beam thereto through an optical system, the recording is carried out under the conditions: $\lambda/NA \leq 680$ nm and $n \cdot Tw \leq 22$ ns wherein the laser beam has a wavelength $\lambda$, the optical system includes an objective lens having a numerical aperture NA, the window margin is Tw, and a signal length corresponding to the shortest recorded mark is $n \cdot Tw$. The method provides for a high transfer rate and minimizes the jitter.

13 Claims, 4 Drawing Sheets

LASER BEAM

OPTICAL RECORDING METHOD AND MEDIUM

This invention relates to an optical recording method capable of high density recording on optical recording media such as phase change optical recording media, and phase change optical recording media to which the optical recording method is applicable.

BACKGROUND OF THE INVENTION

Great attention is now paid to optical recording media capable of high density recording and erasing the once recorded information for rewriting. Among such rewritable optical recording media, phase change recording media are designed such that recording is performed by irradiating a laser beam to a recording layer to change its crystalline state and reading is performed by detecting the change of reflectivity of the recording layer associated with that state change. The phase change recording media are of greater interest because the drive unit used for their operation may have a simple optical system as compared with that used for magneto-optical recording media.

For the phase change recording layer, calcogenide materials such as Ge—Sb—Te are often used because of a greater difference in reflectivity between the crystalline and amorphous states and a relatively high stability in the amorphous state.

When information is recorded in a phase change optical recording medium, the recording layer is irradiated with a laser beam having a high power (recording power) sufficient to heat the recording layer at or above its melting point. In the region where the recording power is applied, the recording layer is melted and then rapidly cooled, forming a recorded mark in the amorphous state. To erase the recorded mark, the recording layer is irradiated with a laser beam having a relatively low power (erasing power) sufficient to heat the recording layer above its crystallization temperature, but below its melting point. The recorded mark to which the erasing power is applied is heated above the crystallization temperature and then slowly cooled, resuming the crystalline state. Therefore, the phase change optical recording medium allows for overwriting simply by modulating the intensity of a single laser beam.

In order to increase the recording density and transfer rate of a recording medium, attempts have been made to reduce the wavelength of recording/reading beam, to increase the numerical aperture of an objective lens in a recording/reading optical system, and to increase the linear velocity of the medium. When a recording laser beam is irradiated to a medium rotating at a linear velocity V, the recording laser beam defines on the surface of the recording layer a spot having a diameter represented by $\lambda/NA$ wherein $\lambda$ is the wavelength of the laser beam and NA is the numerical aperture of the objective lens. The spot diameter $\lambda/NA$ divided by the linear velocity V, i.e., $(\lambda/NA)/V$ gives the time of irradiation of laser beam to the recording layer, that is, the time taken for passage across a beam spot. As the recording density and transfer rate increase, the irradiation time of laser beam to the recording layer becomes shorter and shorter. This makes it difficult to optimize overwriting conditions.

Problems arising from overwriting at an increased linear velocity are discussed below.

An increased linear velocity leads to a shortened irradiation time of recording beam. It is then a common practice to increase the recording power in proportion to the increased linear velocity for preventing the heated temperature of the recording layer from lowering. However, as the linear velocity increases, the rate of cooling following recording beam irradiation increases. To form an amorphous recorded mark, the recording layer, once melted by recording beam irradiation, must be cooled at or above a rate corresponding to the crystallization speed. For the given construction of recording layer and the given thermal design of medium, the cooling rate of the recording layer depends on the linear velocity. The cooling rate becomes higher at a higher linear velocity and lower at a lower linear velocity.

On the other hand, to erase the amorphous recorded mark (to recrystallize), erase beam must be irradiated such that the recording layer may be held for at least a predetermined time at a temperature between the crystallization temperature and the melting point. An attempt to increase the erasing power in proportion to the increased linear velocity for preventing the heated temperature of the recording layer from lowering has a less likelihood to erase the recorded mark because the irradiation time is reduced as a result of the increased linear velocity.

Therefore, to increase the linear velocity for improving the transfer rate, the recording layer must be formed of a composition having a relatively high crystallization speed such that recrystallization is completed within a relatively short time (as disclosed in JP-A 1-78444 and JP-A 10-326436), or the medium must be structured so as to retard heat release from the recording layer (slow cooling structure). It is also believed that the medium of slow cooling structure is also advantageous for preventing any drop of recording sensitivity which can otherwise occur as a result of an increased linear velocity, as described in JP-A 7-262613 and 8-63784.

The inventors made an experiment of overwriting on a phase change optical recording medium at a high transfer rate. The phase change optical recording medium used had a recording layer of a composition having a high crystallization speed so as to enable erasion at a high linear velocity and was structured for slow cooling. An attempt was made to gradually reduce the window margin Tw in order to increase the transfer rate. It became difficult to reduce the jitter when the signal length corresponding to the shortest recorded mark which was reduced in accordance with the reduction of window margin Tw was reduced below a certain value.

SUMMARY OF THE INVENTION

An object of the invention is to provide an optical recording method capable of increasing a transfer rate while minimizing the jitter. Another object of the invention is to provide an optical recording medium to which the method is applicable.

These and other objects are achieved by the invention which is defined below.

(1) An optical recording method for recording information in an optical recording medium having a recording layer by irradiating a laser beam thereto through an optical system, wherein provided that the laser beam has a wavelength $\lambda$, the optical system includes an objective lens having a numerical aperture NA, the window margin is Tw, and a signal length corresponding to the shortest recorded mark is n·Tw, the recording is carried out under the conditions: $\lambda/NA \leq 680$ nm, and $n·Tw \leq 22$ ns.

(2) The optical recording method of (1) wherein provided that the laser beam used to form the shortest recorded mark has an emission time Tmin, the recording is carried out under the condition: $0.113 \leq Tmin/(n·Tw) \leq 1.0$.

(3) The optical recording method of (1) or (2) wherein said recording layer is a phase change recording layer.

(4) The optical recording method of any one of (1) to (3) wherein the recording is carried out at a linear velocity V which satisfies the condition: $(\lambda/NA)/V \leq 60$ ns.

(5) The optical recording method of any one of (1) to (4) wherein said optical recording medium includes the recording layer, a dielectric layer, and a reflective layer stacked in the order from closer to remoter one as viewed from the incident side of the recording laser beam, the reflective layer has a thermal conductivity $K_R$ of at least 100 W/mK, and the dielectric layer disposed between the recording layer and the reflective layer has a thermal conductivity $K_{2D}$ of at least 1 W/mK.

(6) The optical recording method of any one of (1) to (5) wherein said optical recording medium includes a light-transmitting substrate, a dielectric layer, and the recording layer stacked in the order from closer to remoter one as viewed from the incident side of the recording laser beam, wherein the dielectric layer disposed between the light-transmitting substrate and the recording layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C < K_D$.

(7) The optical recording method of any one of (1) to (6) wherein the recording layer is represented by an atomic ratio composition:

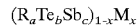
$(R_a Te_b Sb_c)_{1-x} M_x$ wherein R denotes rare earth elements, Te is tellurium, Sb is antimony, and M denotes constituent elements excluding R, Te and Sb, and letters a, b, c and x satisfy: $a+b+c=1$, $a>0$, $0.4 \leq c \leq 0.95$, $a/b \leq 1.2$, $a/c \leq 0.7$, and $0 \leq x \leq 0.1$.

(8) An optical recording medium comprising a phase change recording layer represented by an atomic ratio composition:

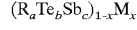
$(R_a Te_b Sb_c)_{1-x} M_x$ wherein R denotes rare earth elements, Te is tellurium, Sb is antimony, and M denotes constituent elements excluding R, Te and Sb, and letters a, b, c and x satisfy: $a+b+c=1$, $a>0$, $0.4 \leq c \leq 0.95$, $a/b \leq 1.2$, $a/c \leq 0.7$, and $0 \leq x \leq 0.1$.

(9) The optical recording medium of (8) wherein said optical recording medium includes the recording layer, a dielectric layer, and a reflective layer stacked in the order from closer to remoter one as viewed from the incident side of a recording laser beam, the reflective layer has a thermal conductivity $K_R$ of at least 100 W/mK, and the dielectric layer disposed between the recording layer and the reflective layer has a thermal conductivity $K_{2D}$ of at least 1 W/mK.

(10) The optical recording medium of (8) or (9) wherein said optical recording medium includes a light-transmitting substrate, a dielectric layer, and the recording layer stacked in the order from closer to remoter one as viewed from the incident side of the recording laser beam, wherein the dielectric layer disposed between the substrate and the recording layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C < K_D$.

(11) An optical recording medium comprising a phase change recording layer, a dielectric layer, and a reflective layer stacked in the described order as viewed from the incident side of a recording laser beam, wherein the reflective layer has a thermal conductivity $K_R$ of at least 100 W/mK, and the dielectric layer disposed between the recording layer and the reflective layer has a thermal conductivity $K_{2D}$ of at least 1 W/mK.

(12) The optical recording medium of (11) further comprising another dielectric layer disposed in front of the recording layer as viewed from the incident side of a recording laser beam, the other dielectric layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C < K_D$.

(13) An optical recording medium comprising a light-transmitting substrate, a dielectric layer, and a phase change recording layer stacked in the order from closer to remoter one as viewed from the incident side of a recording laser beam, wherein the dielectric layer disposed between the substrate and the recording layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C < K_D$.

In the experiment of carrying out overwriting at a high transfer rate, the inventors have found that when the signal length corresponding to the shortest recorded mark, n·Tw (sometimes referred to as shortest signal length) is below a specific value, the shortest recorded mark is substantially deformed by self-erasing, resulting in an increased jitter. The self-erasing is described below.

In the prior art, whether or not characteristics of a phase change optical recording medium are good was judged by examining whether or not a satisfactory C/N is available at the linear velocity used and whether or not a satisfactory erasability is achievable upon erasing. However, too high an erasability rather adversely affects the characteristics. A high erasability means that the crystallization speed of the recording layer is fully high at the linear velocity used. In the recording layer having a high crystallization speed, a phenomenon occurs that when a trailing end portion of the recorded mark is being formed, for example, another portion, especially a leading end portion of the recorded mark is slowly cooled and recrystallized due to diffusion of heat in the lateral direction of the recording layer. Namely, the recorded mark is partially erased. This phenomenon is designated "self-erasing" in this specification. Since a medium having too high an erasability experiences a lowering of C/N and an increase of jitter owing to the self-erasing, a need exists to optimize the erasability. For example, JP-A 9-7176 describes a method of dividing a recording signal pulse and optimizing the pulse division pattern in accordance with the linear velocity, for preventing self-erasing from occurring when a medium designed for a high linear velocity is operated at a low linear velocity. The division pattern of recording signal pulse is generally referred to as recording pulse strategy.

In the above-mentioned experiment of carrying out overwriting at a high transfer rate, the inventors set the recording pulse strategy so as to minimize the jitter. However, as the shortest signal length n·Tw was shortened, it became impossible to divide the recording signal pulse during formation of the shortest recorded mark, owing to restrictions by the response or rise and fall characteristics of a laser beam emitting element. It was then impossible to restrain the jitter within an acceptable range when n·Tw was shortened.

Continuing further experiments, the inventors have found that in the event that the recording signal pulse used to form the shortest recorded mark cannot be divided, that is, a single pulse has to be used, the self-erasing may be alleviated by reducing the ratio of the recording signal pulse width to the shortest signal length n·Tw. However, the need to use a single pulse as the recording signal pulse arises in the situation that the shortest signal length n·Tw is short. To reduce the ratio of the recording signal pulse width to the shortest signal length n·Tw in that situation, the recording signal pulse width must be significantly reduced. On the other hand, the recording signal pulse width, that is, the light emission time of a laser beam emitting element (designated Tmin, hereinafter) cannot be extremely shortened owing to restrictions by the rise and fall characteristics of the laser beam emitting element. Therefore, there is a desire to have a medium which can reduce the jitter even when the light emission time Tmin is set relatively long, that is, when the ratio of the recording signal pulse width to the shortest signal length n·Tw is set relatively high.

Continuing further experiments based on the above experiments and considerations, the inventors have found that in the situation that the shortest signal length n·Tw is below a specific value and the recording signal pulse used to form the shortest signal is a single pulse, if a medium of rapid cooling structure is used, the jitter can be reduced even when the ratio Tmin/(n·Tw) of the light emission time Tmin to the shortest signal length n·Tw, is relatively high.

To enable erasing at a high linear velocity and to compensate for a drop of sensitivity due to the increased linear velocity, a slow cooling structure was customarily employed in the prior art as described in JP-A 7-262613 and 8-63784. However, if a medium of slow cooling structure is used in high transfer rate recording entailing a shortest signal length n·Tw of 22 ns or less, the jitter cannot be reduced as opposed to the present invention. It is noted that if a medium of rapid cooling structure as in the present invention is used and overwriting is carried out at a high linear velocity, a substantial drop of sensitivity occurs and the erasing of recorded marks becomes difficult.

In contrast, the present invention accommodates for the difficulty of erasing upon high linear velocity overwriting by controlling the composition of the recording layer. Also, by setting $\lambda/NA \leq 680$ nm (wherein the recording beam has a wavelength $\lambda$ and the optical system objective lens has a numerical aperture NA), that is, by reducing the spot diameter of the laser beam used in overwriting, the energy density within the beam spot is increased to thereby compensate for the sensitivity drop. As a result, the invention is successful in reducing the jitter without incurring a drop of recording sensitivity and a drop of erasability.

It is noted that in the examples of the above-referenced JP-A 7-262613 and 8-63784, the objective lens has a numerical aperture of 0.5 and the laser wavelength is 780 nm. If the medium has a rapid cooling structure in such greater $\lambda/NA$ cases, the recording sensitivity lowers to interfere with recording, as demonstrated in these patent references.

The invention provides the medium with a rapid cooling structure by controlling the thermal conductivity of the reflective layer and the dielectric layer or by constructing the dielectric layer as a laminate structure including a plurality of dielectric sublayers having different thermal conductivity.

The invention remains effective independent of a linear velocity as long as the shortest signal length n·Tw is not greater than the specific value. It is noted that as the linear velocity becomes higher, the crystallization speed of the recording layer must be increased high enough to erase recorded marks and as a result, the influence of self-erasing becomes substantial. For this reason, the invention is especially effective upon high linear velocity recording.

As described above, the invention is effective when the irradiation time of laser beam to the recording layer is short so that the crystallization speed of the recording layer must be increased. Specifically, the invention is effective when the beam spot passage time $(\lambda/NA)/V$ serving as an index of laser irradiation time is not greater than 60 ns, that is, $(\lambda/NA)/V \leq 60$ ns.

Although the invention is effective particularly for phase change recording media, it is also applicable to other optical recording media of heat mode recording, such as magneto-optical recording media. In magneto-optical recording media as well, the recording pulse strategy is utilized in order to control heat transfer in the lateral direction of the recording layer. However, if the transfer rate becomes increased, the pulse division becomes impossible for the shortest recorded mark and so, the jitter becomes increased. By applying the invention to such media, the jitter can be reduced.

DESCRIPTION OF PREFERRED EMBODIMENTS

Optical Recording Method

Figure 1:
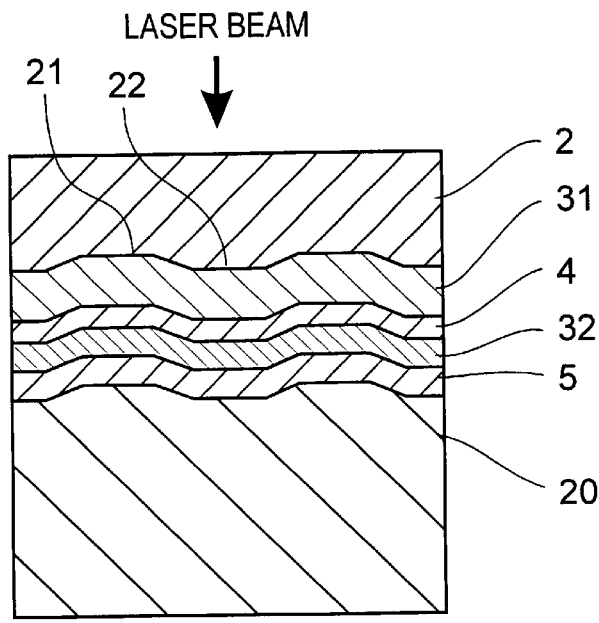
FIG. 1 is a fragmentary cross-sectional view of an optical recording medium as embodied by the invention.

In an optical recording method for recording information in an optical recording medium having a recording layer by irradiating a laser beam thereto through an optical system, the invention sets up the condition:

$$\lambda/NA \leq 680 \text{ nm},$$

and preferably $\lambda/NA \leq 630$ nm,
wherein the laser beam used for recording has a wavelength $\lambda$, and the optical system includes an objective lens having a numerical aperture NA. If $\lambda/NA$ is too large, the arrangement pitch of recorded tracks must be increased whereby it becomes difficult to increase the recording density. Also, if $\lambda/NA$ is too large, the spot of the laser beam does not have a fully high energy density, which requires a medium of slow cooling structure in order to carry out overwriting with a relatively low power, preventing application of the invention. It is noted that practical limits are imposed on the available laser wavelength and numerical aperture. It is difficult to have an extremely short wavelength and an extremely large numerical aperture. Accordingly, the condition: 250 nm≦λ/NA, especially 350 nm≦λ/NA is recommended.

The invention also sets up the condition:

$$n \cdot Tw \leq 22 \text{ ns},$$

and preferably n·Tw≦18 ns, wherein the window margin is Tw, and a signal length corresponding to the shortest recorded mark is n·Tw. If the shortest signal length n·Tw is long beyond the limit, it is unnecessary to apply the invention. It is noted that practical limits are imposed on the response or rise and fall characteristics of a laser beam emitting element. If n·Tw is too short, the laser beam emitting element cannot normally emit light upon formation of the shortest recorded mark. Accordingly, the condition: 2 ns≦n·Tw, especially 4 ns≦n·Tw is recommended.

The shortest signal length n·Tw corresponds to the 2T signal in the case of 1–7 modulation, for example. In this case, n is equal to 2. The shortest signal length n·Tw corresponds to the 3T signal in the case of 8–16 modulation. In this case, n is equal to 3.

It is noted that the data transfer rate is correlated to n·Tw and to the format efficiency as well. For the same n·Tw, the data transfer rate becomes lower as the format efficiency decreases. Accordingly, the recording rate is more directly represented by n·Tw. Among prior art optical recording disks, DVD-RAM 4.7 having a recording capacity of 4.7 GB/side has a linear velocity of 8.2 m/s, a transfer rate of 22 Mbps, and n·Tw of 51.41 ns. Similarly, DVD-RW having a recording capacity of 4.7 GB/side has a linear velocity of 3.5 m/s, a transfer rate of 11 Mbps, and n·Tw of 78.48 ns. Therefore, the shortest signal length n·Tw≦22 ns as set forth by the invention is substantially shorter than in the prior art optical recording disks.

In a preferred embodiment of the invention, the recording is carried out under the condition:

$$0.113 \leq T\min/(n \cdot Tw) \leq 1.0,$$

and more preferably 0.145≦Tmin/(n·Tw)≦0.5, wherein the laser beam used to form the shortest recorded mark has an emission time Tmin. If Tmin/(n·Tw) is too small for the short range of n·Tw, the normal emission of recording laser beam is retarded due to restrictions on the response of the laser beam emitting element. If Tmin/(n·Tw) is too large, on the other hand, the shortest recorded mark becomes too longer than the predetermined value, resulting in an increased jitter.

The invention is effective especially when the irradiation time of laser beam to the recording layer is so short that the crystallization speed of the recording layer must be increased. Then in a further preferred embodiment, the invention sets up the condition:

$$(\lambda/NA)/V \leq 60 \text{ ns},$$

and more preferably, (λ/NA)/V≦50 ns, wherein the recording is carried out at a linear velocity V. (λ/NA)/V is a beam spot passage time, which is an index of the irradiation time of laser beam to the recording layer. If (λ/NA)/V is too small, it becomes difficult to reduce the jitter even when the invention is applied. Accordingly, the condition: 13 ns≦(λ/NA)/V, more preferably 15 ns≦(λ/NA)/V, especially 19 ns≦(λ/NA)/V is recommended.

The linear velocity V during recording is not critical. It is noted that a high linear velocity permits to establish a high transfer rate without substantially reducing λ/NA. Since the influence of self-erasing becomes substantial in case of recording at a high linear velocity, the invention is effective especially at such a high linear velocity. Accordingly, a high linear velocity upon recording is recommended in the practice of the invention. Specifically, the preferred linear velocity is at least 8.0 m/s (i.e., V≧8.0 m/s), and especially at least 9.6 m/s. It is noted that too high a linear velocity gives rise to problems associated with the cost of medium drive apparatus and the stability of medium during driving. Accordingly, the linear velocity should preferably be up to 35 m/s, and especially up to 30 m/s.

Optical Recording Medium

Described below is the optical recording medium to which the inventive optical recording method is applicable.

The optical recording medium of the invention is a phase change recording medium which produces a minimal jitter once recorded by the optical recording method of the invention. Upon reading, the medium should preferably provide a jitter of up to 13%, especially up to 10%. As previously described, the medium to which the optical recording method of the invention is applicable has a recording layer with a relatively high crystallization speed and a rapid cooling structure. The rapid cooling structure is effective not only upon writing, but also upon reading. Since a laser beam having a small beam spot diameter is used in the invention, the beam spot has a high energy density. The high energy density has a likelihood to erase the recorded marks upon reading, however, the rapid cooling structure used herein prevents the recorded marks from being erased upon reading.

According to the invention, it suffices that the optical recording medium provides a fully reduced jitter when combined with the optical recording method described above. Accordingly, the recording layer composition and the medium structure can be determined as appropriate so that the jitter may fall within the acceptable range, though it is recommended that the composition and the structure conform to the following descriptions.

Structure of FIG. 1

FIG. 1 illustrates an exemplary construction of an optical recording medium according to the invention. The optical recording medium includes on a supporting substrate 20, a reflective layer 5 of metal or metalloid, a second dielectric layer 32, a phase change recording layer 4, a first dielectric layer 31, and a light-transmitting substrate 2 stacked in the described order. Recording/reading beam is irradiated to the recording layer 4 through the light-transmitting substrate 2 (from the upper side in FIG. 1). An intermediate layer of dielectric material may be disposed between the supporting substrate 20 and the reflective layer 5.

Supporting Substrate 20

The supporting substrate 20 is provided to maintain rigidity for the medium. The supporting substrate 20 usually has a thickness of about 0.2 to 1.2 mm, preferably 0.4 to 1.2 mm, and may be transparent or opaque. The supporting substrate 20 may be formed of any resin like conventional optical recording media although glass may also be used. Grooves (guide channels) 21 commonly provided in optical recording media can be formed by forming grooves in the supporting substrate 20 and transferring them to the respective overlying layers, as in the illustrated embodiment. The grooves 21 are regions located closer to the incident side of recording/reading laser beam, with regions interposed between adjacent grooves serving as lands 22.

Reflective Layer 5

The reflective layer may be formed of any material which is usually selected from metals and metalloids such as Al, Au, Ag, Pt, Cu, Ni, Cr, Ti and Si and alloys containing at least one such metal or metalloid. Since the invention requires the medium to be a rapid cooling structure, it is preferred to form the reflective layer from a material having a high thermal conductivity. Preferred high thermal conductivity materials are Ag and Al. Since Ag or Al alone, however, is less resistant to corrosion, it is recommended to add another element to Ag or Al for improving corrosion resistance. In the medium of the structure shown in FIG. 1, the reflective layer tends to have an increased surface roughness on the laser beam incident side due to crystal growth during its formation. The increased surface roughness can lead to an increased read noise. It is thus preferred to reduce the grain size of the reflective layer. In this regard too, it is recommended to add another element to Ag or Al rather than the use of Ag or Al alone, so that the reflective layer may be formed to a smaller grain size and as an amorphous layer.

Since the addition of another element often entails a decline of thermal conductivity, it is preferred to use Ag having a higher thermal conductivity as a main element for avoiding such inconvenience. The preferred auxiliary element to be added to Ag is at least one selected from among Mg, Pd, Ce, Cu, Ge, La, S, Sb, Si, Te, and Zr. One or more of these auxiliary elements may be used. The content of auxiliary elements in the reflective layer is preferably 0.05 to 2.0 atom %, more preferably 0.2 to 1.0 atom % for each element, and preferably 0.2 to 5 atom %, more preferably 0.5 to 3 atom % in total. Too small contents of auxiliary elements fail to exert the desired effects. Too large contents of auxiliary elements would result in a decline of thermal conductivity.

It is noted that the thermal conductivity of the reflective layer decreases as the grain size becomes smaller. If the reflective layer is amorphous, it is difficult to secure a sufficient cooling rate upon recording. Therefore, once the reflective layer is formed as an amorphous layer, heat treatment is preferably carried out for crystallization. The procedure of inducing crystallization of the initially amorphous layer has the advantage that the layer maintains the surface roughness that the amorphous layer has had and the thermal conductivity is increased by crystallization.

The reflective layer should preferably has a thermal conductivity $K_R$ of at least 100 W/mK, more preferably at least 150 W/mK. The thermal conductivity can be calculated according to Wiedemann-Franz's law from the electric resistance of the reflective layer measured by the four-probe method. No upper limit is imposed on the thermal conductivity of the reflective layer. That is, use may be made of pure silver having the highest thermal conductivity of 250 W/mK among the materials which can be used to form the reflective layer.

The reflective layer preferably has a thickness of 10 to 300 nm. A layer with a thickness below the range may fail to provide a sufficient reflectivity whereas a layer with a thickness above the range achieves little further improvement in reflectivity and is economically disadvantageous. The reflective layer is preferably formed by a vapor deposition technique such as sputtering or evaporation.

First and Second Dielectric Layers 31 and 32

These dielectric layers prevent the recording layer from oxidation and degradation and protect the supporting substrate 20 and light-transmitting substrate 2 by insulating the heat transferred from the recording layer during recording or releasing the heat in the lateral direction. The provision of these dielectric layers improves the degree of modulation. Each of the first and second dielectric layers 31 and 32 may be a laminate of two or more dielectric sublayers having different compositions.

The dielectric materials used in these dielectric layers are preferably compounds containing at least one metal component selected from Si, Ge, Zn, Al, and rare earth elements. The preferred compounds are oxides, nitrides and sulfides while mixtures containing at least two of these compounds are also useful.

To provide a rapid cooling structure, it is preferred that the dielectric layers, especially second dielectric layer 32 be formed of a dielectric material having a high thermal conductivity. Preferred dielectric materials having a high thermal conductivity are mixtures of zinc sulfide and silicon oxide ($ZnS—SiO_2$), aluminum nitride, aluminum oxide, silicon nitride and tantalum oxide, with oxides and/or nitrides of aluminum and oxides and/or nitrides of silicon being especially preferred. The $ZnS—SiO_2$ mixtures are preferably those containing 30 to 60 mol % of $SiO_2$. Such mixtures with too low $SiO_2$ contents have a low thermal conductivity whereas mixtures with too high $SiO_2$ contents are less adherent to another layer, with a possibility to undergo delamination during long-term storage.

The second dielectric layer 32 (disposed between the recording layer 4 and the reflective layer 5) preferably has a thermal conductivity $K_{2D}$ of at least 1 W/mK, more preferably at least 1.5 W/mK. No upper limit is imposed on the thermal conductivity of the second dielectric layer 32 although materials which can be used to form the dielectric layers generally have a thermal conductivity of less than about 100 W/mK. It is noted that the thermal conductivity of the dielectric layer as used herein is not a measurement in the thin film state, but a measurement of a bulk material. In the embodiment wherein the second dielectric layer 32 is a laminate of two or more dielectric sublayers, the second dielectric layer 32 as a whole may have a thermal conductivity of at least 1 W/mK. It is desirable that all the sublayers of the second dielectric layer 32 have a thermal conductivity of at least 1 W/mK.

Preferably the thermal conductivity $K_R$ of the reflective layer is correlated to the thermal conductivity $K_{2D}$ of the second dielectric layer 32 so as to satisfy the relationship:

$$K_R \geq -1.6 K_{2D} + 166.$$

This correlation of $K_R$ to $K_{2D}$ ensures that the recording layer is rapidly cooled.

Figure 2:
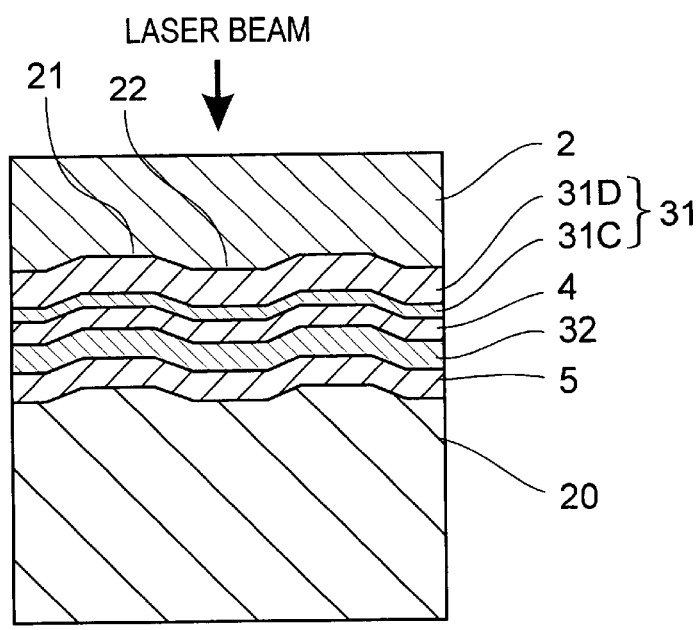
FIG. 2 is a fragmentary cross-sectional view of another optical recording medium as embodied by the invention.

To construct the medium as a rapid cooling structure, it is preferred that the first dielectric layer 31 be a laminate of two or more dielectric sublayers as shown in FIG. 2. In the embodiment illustrated in FIG. 2, the first dielectric layer 31 consists of a dielectric sublayer 31C disposed close to the recording layer 4 and another dielectric sublayer 31D disposed remote from the recording layer 4. Except for the first dielectric layer 31, the medium of FIG. 2 is the same as the medium of FIG. 1. In the FIG. 2 embodiment, the dielectric sublayer 31C has a thermal conductivity $K_C$, and the other dielectric sublayer 31D has a thermal conductivity $K_D$. In order that the medium be a rapid cooling structure, it is preferred that the dielectric sublayers have such thermal conductivities as to satisfy $K_C < K_D$, more preferably $1.5 \leq K_D/K_C$. Greater $K_D/K_C$ ratios achieve greater quenching effects. No upper limit is imposed on $K_D/K_C$. Since an upper limit is imposed on the thermal conductivity of materials which can be used to form the dielectric layers as mentioned above, $K_D/K_C$ is also restricted by such limits. Usually $K_D/K_C$ does not exceed 180. To achieve satisfactory quenching effects, it is preferred that $K_C$ be less than 1 W/mK, and $K_D$ be at least 1 W/mK, especially at least 1.5 W/mK. Although no lower limit is imposed on $K_C$, the materials which can be used to form the dielectric layers usually have a thermal conductivity of more than about 0.1 W/mK.

The thickness of each dielectric sublayer may be determined as appropriate so as to provide the desired medium reflectivity, depending on the optical constants of the material of which the sublayer is formed. To achieve satisfactory quenching effects, the dielectric sublayer 31C has a thickness $t_C$ and the other dielectric sublayer 31D has a thickness $t_D$ in the range:

$$5 \text{ nm} \leq t_C \leq 60 \text{ nm, and}$$

$$30 \text{ nm} \leq t_D$$

Although no upper limit is imposed on $t_D$, the first dielectric layer 31 should preferably have a total thickness within a specific range to be described later.

Rapid cooling becomes possible when the two dielectric sublayers of the first dielectric layer have thermal conductivities within the above-defined relationship, probably because the heat transfer to be described below takes place. In a prior art structure including a first dielectric layer 31 having a relatively low thermal conductivity, heat release to the side of the high thermal conductivity reflective layer 5 becomes predominant. By contrast, when the first dielectric layer 31 is of the multilayer structure, a considerable amount of heat release takes place on the side of the first dielectric layer 31 so that the recording layer may be more rapidly cooled. More specifically, the heat generated in the recording layer 4 upon recording is initially transferred to the dielectric sublayer 31C. Since the dielectric sublayer 31C has a low thermal conductivity, the heat having reached the sublayer 31C does not spread in the lateral direction thereof, but transfer to the other dielectric sublayer 31D disposed vertically adjacent thereto. Since the other dielectric sublayer 31D has a high thermal conductivity, the heat having reached the sublayer 31D quickly diffuses in the lateral direction thereof. In this way, the heat generated in the recording layer 4 is spread with difficulty in the plane of the dielectric sublayer 31C adjoining the recording layer 4 and quickly diffused within the other dielectric sublayer 31D remote from the recording layer 4. This mechanism ensures rapid cooling upon recording.

In order that the recording layer 4 be rapidly cooled, it is desired that the one dielectric sublayer 31C be disposed contiguous to the recording layer 4 as illustrated in FIG. 2. However, an intervening layer may be disposed therebetween if desired. For example, in the event that the heat during recording causes some elements from the dielectric sublayer 31C to be diffused into the recording layer 4 whereby the recording layer 4 can be degraded, a further dielectric sublayer serving as a barrier layer may be disposed between the dielectric sublayer 31C and the recording layer 4. If the thermal conductivity of the barrier layer is approximate to that of the dielectric sublayer 31C, the barrier layer is regarded a part of the dielectric sublayer 31C, and the total thickness of the dielectric sublayer 31C and the barrier layer may fall within the above-described permissible range of thickness $t_C$. If the thermal conductivity of the barrier layer is higher than that of the dielectric sublayer 31C, say, higher than about 1 W/mK, the barrier layer should preferably have a thickness of less than about 20 nm. If the barrier layer is too thick in this situation, the rapid cooling effects can be exacerbated.

Also, to acquire optical enhancement effects, for example, one or both of the dielectric sublayers 31C and 31D may be constructed of a plurality of laminas. In this embodiment, the thermal conductivity $K_C$ of the dielectric sublayer 31C as a whole and the thermal conductivity $K_D$ of the dielectric sublayer 31D as a whole may have the above-described relationship. More preferably, all the plural laminas constituting the dielectric sublayer 31C and all the plural laminas constituting the dielectric sublayer 31D satisfy the above-described relationship.

The thicknesses of the first and second dielectric layers may be determined as appropriate so as to provide satisfactory protective effects and modulation improving effects. Usually, the first dielectric layer 31 preferably has a thickness of 30 to 300 nm, more preferably 50 to 250 nm, and the second dielectric layer 32 preferably has a thickness of 10 to 50 nm. To provide a rapid cooling structure, the second dielectric layer 32 should more preferably have a thickness of up to 30 nm, most preferably up to 25 nm.

The dielectric layers are preferably formed by sputtering.

Recording Layer 4

The composition of the recording layer 4 is not critical and may be suitably selected from a variety of phase change materials, preferably phase change materials containing at least antimony (Sb) and tellurium (Te). Since a recording layer consisting solely of Sb and Te has a crystallization temperature as low as about 130° C. and is insufficient in storage reliability, another element(s) is preferably added for raising the crystallization temperature. The additive element is preferably at least one selected from among In, Ag, Au, Bi, Se, Al, P, Ge, H, Si, C, V, W, Ta, Zn, Ti, Sn, Pb, Pd, and rare earth elements (including Sc, Y and lanthanoids). Of these, at least one element selected from among rare earth elements, Ag, In and Ge is especially preferred because of outstanding storage reliability improving effects.

Since a medium of rapid cooling structure is used according to the invention, erasing at a high linear velocity is difficult. To overcome the problem, it is preferred that the recording layer have a high crystallization speed. The crystallization speed may be accelerated by increasing the Sb content and selecting a rare earth element as the additive. The addition of a rare earth element is effective for improving the storage reliability and accelerating the crystallization speed. The preferred rare earth element is at least one of Tb, Dy and Gd.

In one embodiment of the invention, the recording layer is represented by an atomic ratio composition:

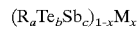
$$(R_a Te_b Sb_c)_{1-x} M_x \qquad \text{I}$$

wherein R denotes rare earth elements, Te is tellurium, Sb is antimony, and M denotes constituent elements excluding R, Te and Sb, and a+b+c=1. Preferably letters a, b, c and x satisfy:

$a \geq 0$, $0.4 \leq c \leq 0.95$, $a/b \leq 1.2$, $a/c \leq 0.7$, and $0 \leq x \leq 0.1$.

Letters a, b and c in formula I are limited for the following reason. If c representative of the Sb content is too small, the results are a too low crystallization speed and a low read output. It is noted that the read output depends on the difference in reflectivity between amorphous recorded marks and crystalline regions, with a greater difference resulting in a higher read output. With very small values of c, recording is difficult. On the other hand, if c is too large, the crystallization speed becomes too high, and the thermal stability of amorphous recorded marks becomes low. The range of c is more preferably $c \geq 0.5$, even more preferably $c \geq 0.6$, and also more preferably $c \leq 0.9$.

The range of "a" representative of the rare earth content is more preferably a>0, and even more preferably $a \geq 0.01$. If "a" is too small, the effects due to rare earth addition, that is, a significant improvement in erasable linear velocity and an improvement in storage reliability are not fully exerted. On the other hand, if the ratio of rare earth elements to Sb+Te is too high, the erasable linear velocity would be very low. Also an amount of Sb should be contained in order to acquire satisfactory read outputs as described above. In this regard, the rare earth content is preferably controlled so that a/b and a/c may fall within the above-defined ranges, in order to acquire a satisfactory read output and a fully high erasable linear velocity. More preferably a, b and c are $a/b \leq 0.8$ and $a/c \leq 0.6$.

The element represented by M is not critical and is preferably at least one selected from the elements described above as exerting storage reliability improving effects. If x representative of the content of element M is too large, the crystallization speed becomes low. The range of x is as described above for this reason and more preferably $0 \leq x \leq 0.08$.

The recording layer preferably has a thickness of more than 4 nm to 50 nm, more preferably from 5 to 30 nm. With too thin a recording layer, the growth of a crystalline phase may be retarded and a phase change may entail only a little change of reflectivity, which in turn, result in a low read output. If the recording layer is too thick, the recording layer may have a large thermal capacity, resulting in difficult recording and a low read output. It is noted that when the recording layer contains a rare earth element, cross-erasing (i.e., erasing of adjacent tracks) readily occurs upon overwriting. To reduce the cross-erasing, the recording layer should desirably have a thickness of up to 13 nm, more desirably up to 10 nm, and even more desirably less than 10 nm. Such a thin recording layer produces a significantly lower read output than a thick recording layer, but the addition of rare earth element to the thin recording layer can significantly restrain lowering of the read output due to slimming of the recording layer. The lowering of the read output due to slimming of the recording layer can also be ameliorated by reducing the wavelength of read beam. To improve the read output from a thin recording layer, the wavelength of read beam is preferably set at 450 nm or shorter. Since too short the wavelength of read beam can rather invite a drop of read output, the wavelength of read beam should preferably be 380 nm or greater.

The recording layer is preferably formed by sputtering.

By properly selecting the composition of the recording layer and/or the wavelength of read beam as described above, the recording layer can be made thinner while maintaining a sufficient read output. The capability of slimming the recording layer is effective for multilayer recording medium. The multilayer recording medium has a structure that two or more recording layers are stacked with a resin layer or dielectric layer intervening therebetween. That is, there is included the recording layer in which recording and reproduction is performed using the recording/reading beam that has transmitted through the other recording layer. In order that a sufficient quantity of recording/reading beam reach all the recording layers, at least the recording layer disposed closer to the beam incident side surface should be relatively thin.

Light-Transmitting Substrate 2

The light-transmitting substrate 2 has a sufficient transparency to transmit recording/reading beam therethrough. A resin or glass plate having a thickness approximate to the supporting substrate 20 may be used as the light-transmitting substrate 2. It is noted that since the invention is advantageous especially when high density recording is carried out, the light-transmitting substrate 2 is preferably made thin in order to achieve a high recording density by virtue of the increased NA of the recording/reading light optical system. In this regard, the light-transmitting substrate 2 should preferably have a thickness in the range of 30 to 300 μm. If the light-transmitting substrate 2 is too thin, dust depositing on the light-transmitting substrate surface can have a substantial optical influence. If the light-transmitting substrate 2 is too thick, on the other hand, it may become difficult to achieve a high recording density by virtue of the increased NA.

A thin light-transmitting substrate 2 can be formed, for example, by applying a light-transmitting sheet of transparent resin to the first dielectric layer 31 with the aid of adhesive or tackifier, with the sheet serving as the light-transmitting substrate. Alternatively, a transparent resin layer is formed directly on the first dielectric layer 31 by a coating technique, with the resin layer serving as the light-transmitting substrate. Since recording/reading beam enters the inventive medium through the light-transmitting substrate 2, the light-transmitting substrate should preferably have high optical homogeneity.

In the invention, the lands and/or grooves may be utilized as recording tracks. In the land/groove recording system utilizing lands and grooves as recording tracks, cross-erasing (i.e., erasing of adjacent tracks) readily occurs upon overwriting. Because of the rapid cooling structure of the inventive medium, the recording power should be somewhat high even when the energy density within a beam spot is high. Also the invention uses a recording layer with a high crystallization speed. The high recording power and the high crystallization speed of the recording layer can cause cross-erasing.

To suppress cross-erasing in the land/groove recording system utilizing both lands and grooves as recording tracks, the invention recommends to set a groove depth of at least $\lambda/7$ as expressed by optical path length. If the grooves are too shallow, the results are frequent cross-erasing, increased cross-talk and increased jitter. A groove depth of up to $\lambda/5$ as expressed by optical path length is recommended in order to restrain the drop of read output and the increase of cross-talk.

Figure 3:
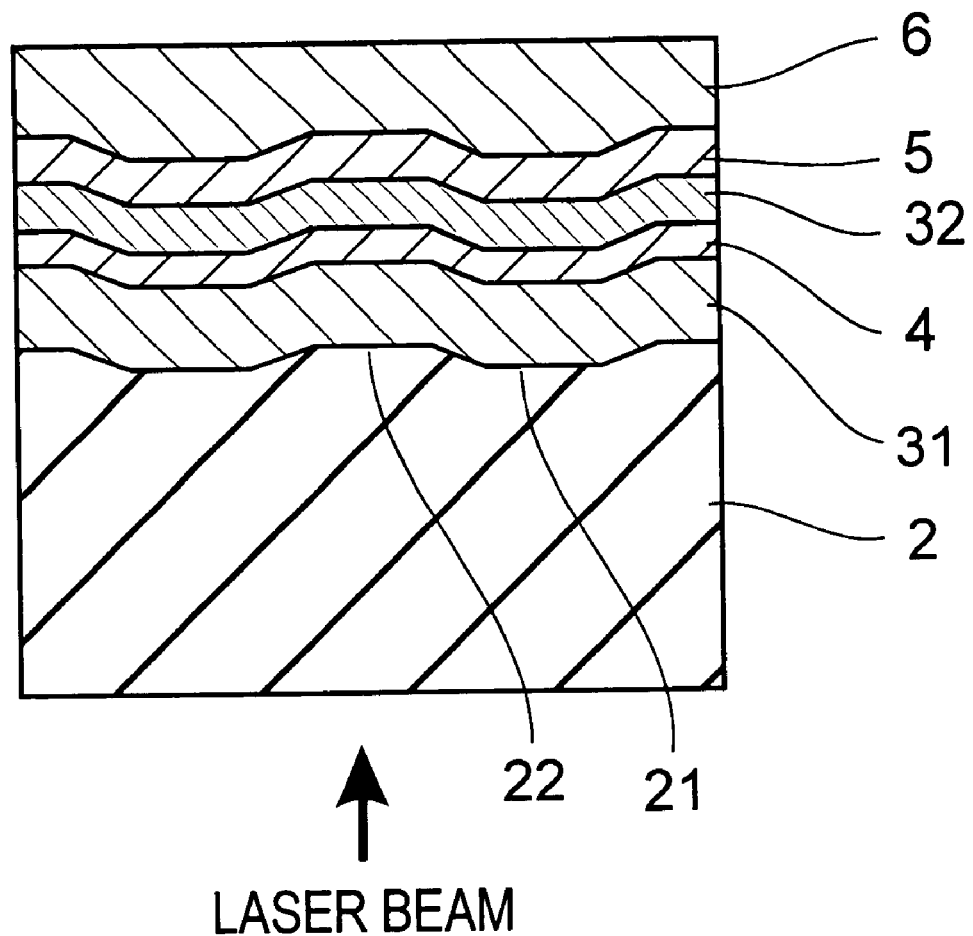
FIG. 3 is a fragmentary cross-sectional view of a further optical recording medium as embodied by the invention.

Structure of FIG. 3

The optical recording medium illustrated in FIG. 3 includes on a light-transmitting substrate 2, a first dielectric layer 31, a recording layer 4, a second dielectric layer 32, a reflective layer 5, and a protective layer 6 stacked in the described order. Recording/reading beam is irradiated to the recording layer 4 through the light-transmitting substrate 2 (from the lower side in FIG. 3).

The light-transmitting substrate 2 in FIG. 3 may be the same as the supporting substrate 20 in FIG. 1 as long as it is light transmissive.

The protective layer 6 is provided for improving mar resistance and corrosion resistance. The protective layer may be formed of various organic materials, preferably radiation-curable compounds and compositions containing the same, which are cured by exposure to radiation such as electron beams or UV light. The protective layer is usually about 0.1 μm to about 100 μm thick. It may be formed by conventional techniques including spin coating, gravure coating, spray coating and dipping.

The remaining layers are the same as in the embodiment illustrated in FIG. 1.

EXAMPLE

Examples of the invention are given below by way of illustration and not by way of limitation.

Example 1

Verification 1 of a Need for Rapid Cooling Structure

Sample No. 101

An optical recording disk sample of the structure illustrated in FIG. 1 was prepared by the following procedure.

The supporting substrate 20 used was formed by injection molding polycarbonate into a disk having a diameter of 120 mm and a thickness of 1.2 mm in which grooves were formed simultaneous with injection molding. The grooves had a depth of λ/6 as expressed by optical path length wherein the wavelength λ was 405 nm. In the land/groove recording system, the recording track pitch was 0.3 μm.

The reflective layer 5 was formed by sputtering in an argon atmosphere. The target used was $Ag_{98}Pd_1Cu_1$. The reflective layer was 100 nm thick and had a thermal conductivity of 170 W/mK.

The second dielectric layer 32 was formed by sputtering in an argon atmosphere. The target used was $ZnS$—$SiO_2$ in a molar ratio $ZnS:SiO_2=80:20$ (thermal conductivity 0.6 W/mK). The second dielectric layer was 20 nm thick.

The recording layer 4 was formed by sputtering an alloy target in an argon atmosphere. The recording layer had an atomic ratio composition:

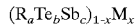

$(R_aTe_bSb_c)_{1-x}M_x$ wherein M is a mixture of In and Ge in a ratio of 1:7, a=0, b=0.20, c=0.80, and x=0.08. The recording layer was 12 nm thick. The composition of the recording layer was determined such that recorded marks could be erased under the condition: n·Tw=15.24 ns.

The first dielectric layer 31 was formed by sputtering in an argon atmosphere. The target used was $ZnS$—$SiO_2$ in a molar ratio $ZnS:SiO_2=80:20$. The first dielectric layer was 130 nm thick.

The light-transmitting substrate 2 was formed by applying a solvent type UV-curable acrylic resin onto the surface of the first dielectric layer 31 to form an adhesive layer of 3 μm thick and joining a polycarbonate sheet of 100 μm thick thereto. The polycarbonate sheet is available under the trade name Pure Ace from Teijin Co., Ltd. and prepared by a flow casting technique.

Sample No. 102

This sample was prepared as was sample No. 101 except that the composition of the recording layer was determined such that recorded marks could be erased under the condition: n·Tw=26.7 ns.

Sample No. 103

This sample was prepared as was sample No. 101 except that the second dielectric layer 32 was formed of silicon nitride (thermal conductivity 8 W/mK).

Evaluation

The recording layers of the disk samples were initialized or crystallized by means of a bulk eraser. Each disk sample was mounted on an optical recording medium tester where recording was carried out under the following conditions.

laser wavelength λ: 405 nm,
numerical aperture NA: 0.85,
recording linear velocity V:
   11.4 m/s for n·Tw=15.24 ns
   6.5 m/s for n·Tw=26.67 ns
recording signals: 1–7 modulation signals (shortest signal length 2Tw)

The recording signal pulse to form the shortest recorded mark was a single pulse. The relative width Tmin/(n·Tw) of the single pulse relative to the shortest signal length was as shown in Table 1. Recording was carried out in both lands and grooves. It is noted that λ/NA was 476 nm, and (λ/NA)/V was 41.8 ns for n·Tw=15.24 ns and 73.3 ns for n·Tw=26.67 ns.

Then, the recorded signals were read out, from which a jitter was calculated. The jitter was a clock jitter which was computed by analyzing read signals by a time interval analyzer to determine a "signal fluctuation"(σ) and dividing it by the window margin Tw, that is, σ/Tw (%). The results are shown in Table 1. It is noted that errors are within the acceptable range when the jitter is 13% or less. To ensure sufficient margins, the jitter should be 10% or less.

TABLE 1

| Sample No. 101 (n · Tw = 15.24 ns) ($K_{2D}$ = 0.6 W/mK*) | | Sample No. 102 (n · Tw = 26.67 ns*) ($K_{2D}$ = 0.6 W/mK*) | | Sample No. 103 (n · Tw = 15.24 ns) ($K_{2D}$ = 8 W/mK) | |
|---|---|---|---|---|---|
| Tmin/ (n · Tw) | Jitter (%) | Tmin/ (n · Tw) | Jitter (%) | Tmin/ (n · Tw) | Jitter (%) |
| 0.11* | — | 0.1* | 9.2 | 0.11* | — |
| 0.135 | 10.7 | 0.125 | 9.1 | 0.135 | 9.8 |
| 0.17 | 11.0 | 0.175 | 8.9 | 0.17 | 9.1 |
| 0.2 | 16.3 | 0.2 | 8.7 | 0.2 | 12.0 |
| 0.215 | 18.0 | 0.275 | 9.6 | 0.215 | 13.7 |

*outside the preferred range

As previously discussed, in order to enable high velocity overwriting, a medium comprising a recording layer having a high crystallization speed must be used. However, the recording layer having a high crystallization speed is prone to recrystallize and hence undergo self-erasing. Therefore, the relative width Tmin/(n·Tw) of the recording signal pulse to form the shortest recorded mark must be small. In fact, in sample No. 101 in Table 1 employing an increased crystallization speed of the recording layer to carry out high velocity overwriting entailing a reduction of the shortest signal length (n·Tw=15.24 ns), the jitter becomes decreased as Tmin/(n·Tw) is smaller. It is to be noted that the jitter is still beyond the acceptable range (≦10%) even when Tmin/(n·Tw) is reduced to 0.135. It is estimated that the jitter will fall within the acceptable range if Tmin/(n·Tw) is further reduced. However, owing to restrictions by the response of the laser beam emitting element, recording was impossible at the setting to Tmin/(n·Tw)=0.11.

On the other hand, sample No. 102 employs a lower crystallization speed of the recording layer to carry out low velocity overwriting entailing an increase of the shortest signal length (n·Tw=26.7 ns) than sample No. 101. As a result, the jitter is not correlated to Tmin/(n·Tw), and falls within the acceptable range (≦10%) independent of Tmin/(n·Tw). Because of the large value of n·Tw, even when Tmin/(n·Tw) was reduced to 0.11, recording was possible without restrictions by the response of the laser beam emitting element.

Furthermore, in sample No. 103 having a rapid cooling structure in which both the reflective layer and the second dielectric layer 32 are formed of high thermal conductivity materials, the self-erasing is mitigated. As a result, the jitter is minimum when Tmin/(n·Tw) is relatively large, with its minimum value being below 10%.

It is evident from the above results that when a medium is given a rapid cooling structure under the condition that the shortest signal length n·Tw is 22 ns or less, the jitter can be reduced for Tmin/(n·Tw) within the range where no restrictions by the response of the laser beam emitting element are imposed.

Example 2

Verification 2 of a Need for Rapid Cooling Structure

Optical recording disk sample Nos. 201 to 203 were fabricated as was sample No. 101 in Example 1 except for the following. The recording layer had the composition:

$$(R_a Te_b Sb_c)_{1-x} M_x$$

wherein M is a mixture of In and Ge in an atomic ratio of 1:6 and a, b, c and x are as indicated in Table 2. The second dielectric layer had a thermal conductivity $K_{2D}$ as indicated in Table 2. It is noted that in Table 2, the second dielectric layer having a thermal conductivity $K_{2D}$ of 44 W/mK was formed of $Al_2O_3$, and the second dielectric layer having a thermal conductivity $K_{2D}$ of 0.6 W/mK was formed of ZnS—$SiO_2$ in a ZnS:$SiO_2$ molar ratio of 80:20.

Figure 4:
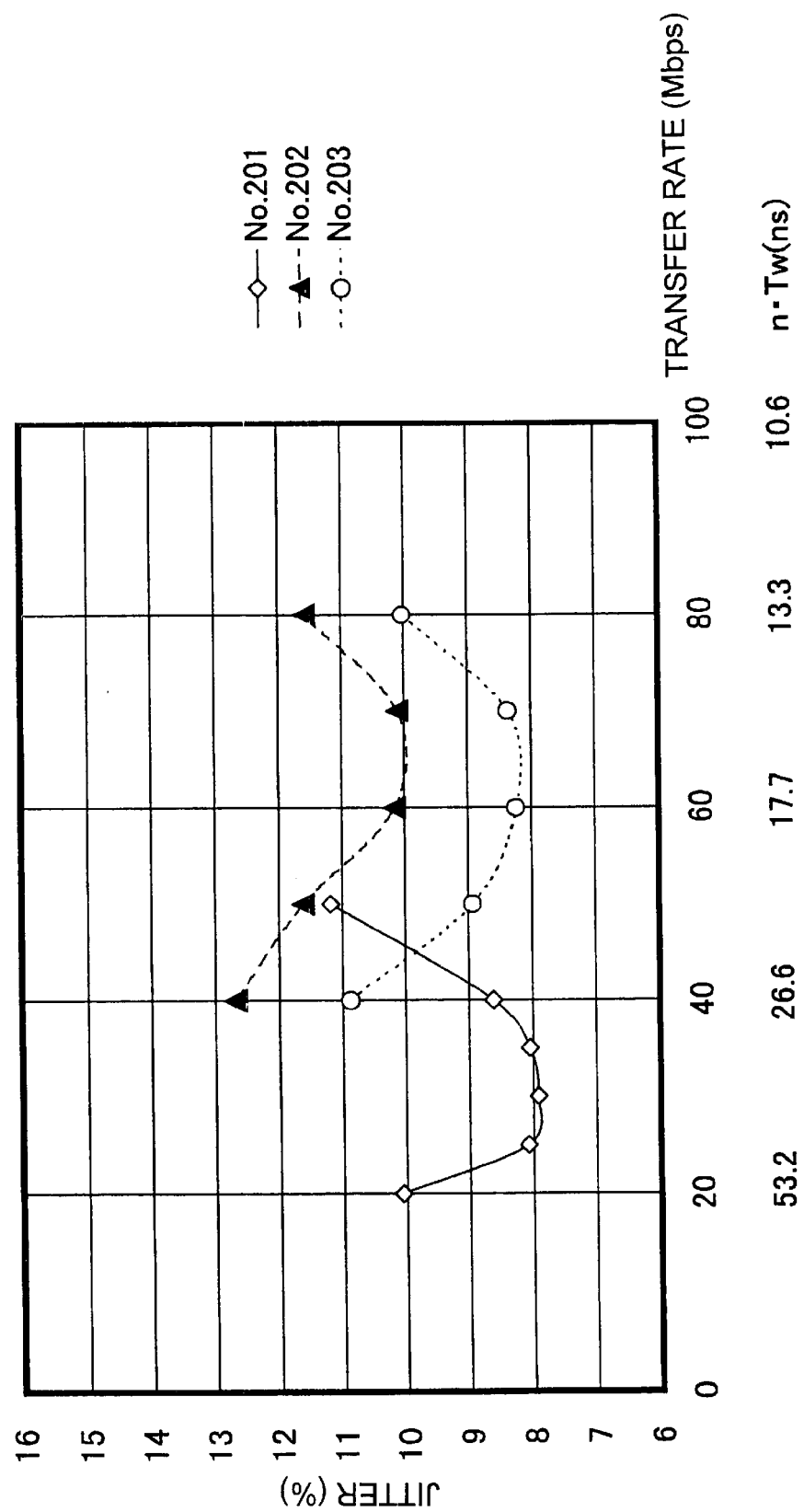
FIG. 4 is a graph showing a jitter (%) as a function of n·Tw and transfer rate.

In these samples, recording was done as in sample No. 101 except that the recording conditions were controlled so that Tmin/(n·Tw) was as indicated in Table 2 and n·Tw was as indicated in FIG. 4. Then, a jitter was determined as in sample No. 101. The results are shown in FIG. 4. FIG. 4 is a graph in which a transfer rate at a formatting efficiency of 80% and n·Tw are on the abscissa and the jitter is on the ordinate. Table 2 also shows the n·Tw and transfer rate for each sample at which the jitter becomes minimum.

TABLE 2

| Sample No. | a | b | c | x | $K_{2D}$ (W/mK) | Tmin/ (n · Tw) | Minimum jitter achieved at | |
|---|---|---|---|---|---|---|---|---|
| | | | | | | | n · Tw (ns) | Transfer rate (Mbps) |
| 201 | 0 | 0.26 | 0.74 | 0.07 | 0.6* | 0.35 | 33.4* | 33.2 |
| 202 | 0 | 0.19 | 0.81 | 0.07 | 0.6* | 0.17 | 15.2 | 70 |
| 203 | 0 | 0.19 | 0.81 | 0.07 | 44 | 0.20 | 15.2 | 70 |

*outside the preferred range

As seen from Table 2, sample No. 201 has a slow cooling structure in which the second dielectric layer has a low thermal conductivity. For this reason, when the transfer rate is increased, the jitter exacerbates sharply as shown in FIG. 4. Sample No. 202 includes a recording layer having a higher Sb content and a higher crystallization speed than sample No. 201, but a second dielectric layer having a low thermal conductivity as in sample No. 201. As a result, the transfer rate at which the jitter becomes minimum was higher than in sample No. 201 although the jitter at that transfer rate was greater than the minimum jitter of sample No. 201 and in excess of 10%.

In contrast, sample 203 has a rapid cooling structure obtained by replacing the second dielectric layer of sample No. 202 by a high thermal conductivity layer. The transfer rate at which the jitter becomes minimum was equal to sample No. 202, but the jitter at that transfer rate was equal to the minimum jitter of sample No. 201 exhibiting the minimum jitter at low transfer rates.

It is evident from Table 2 and FIG. 4 that in the case of high transfer rate recording entailing a short n·Tw of 22 ns or less, the jitter can be reduced to an equivalent level to the low transfer rate recording only when the medium is designed to a rapid cooling structure.

Example 3

Comparison of n·Tw

Sample No. 1

A disk sample was fabricated as was sample No. 101 in Example 1 except that the second dielectric layer 32 was formed of $Al_2O_3$ (thermal conductivity 44 W/mK).

This sample was measured for jitter as in Example 1 except that the recording linear velocity V was set at 11.4 m/s so as to provide n·Tw=15.24 ns and Tmin/(n·Tw) was from 0.1 to 0.4. The results are shown in FIG. 5.

Figure 5:
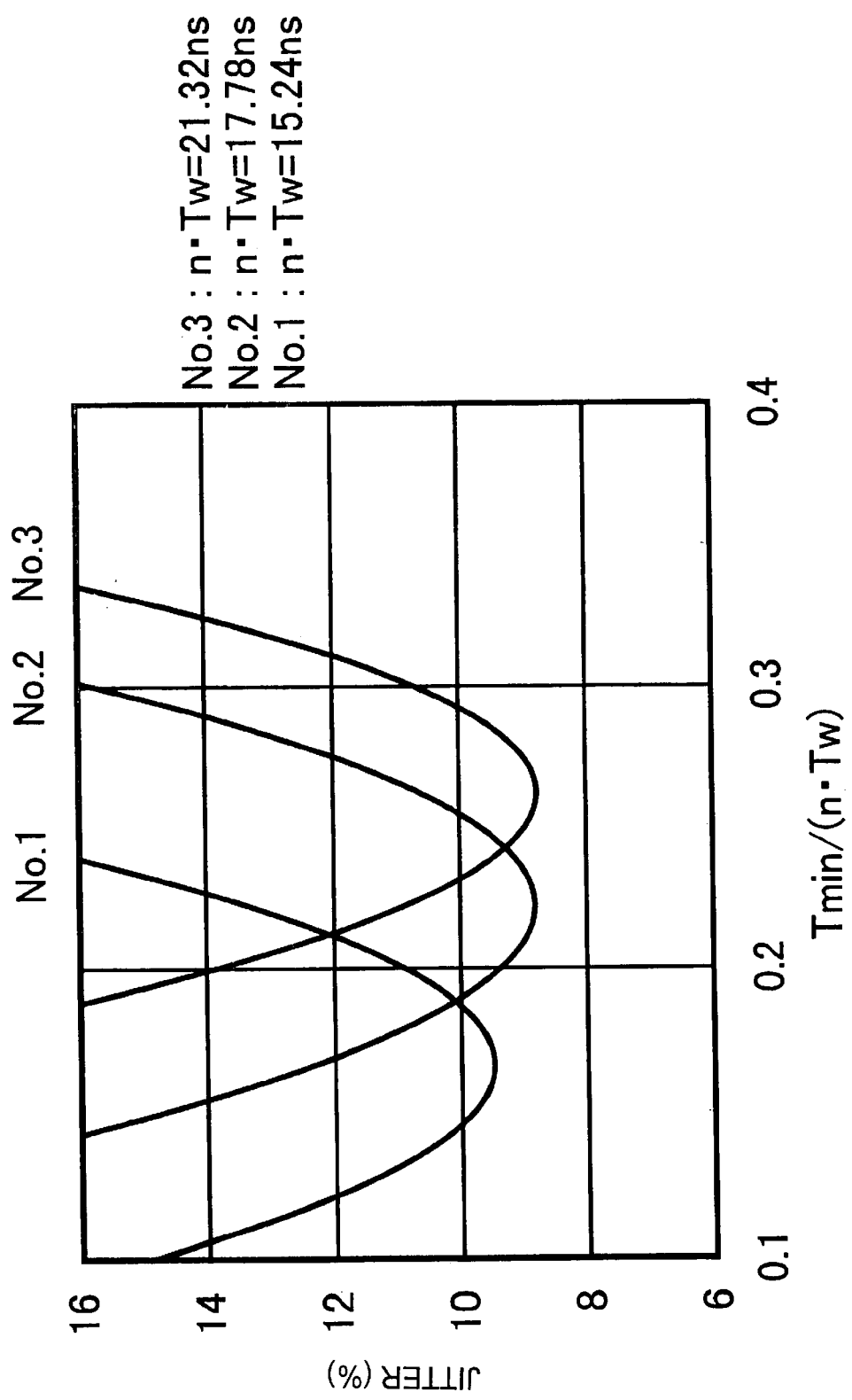
FIG. 5 is a graph showing a jitter (%) as a function of Tmin/(n·Tw).

Curves in FIG. 5 are quadratic curves approximating to measurements at Tmin/(n·Tw) in the range of 0.1 to 0.4.

Sample No. 2

An optical recording disk sample was fabricated as was sample No. 1 except that the composition of the recording layer was changed. This sample was measured for jitter as was sample No. 1 except that the recording linear velocity V was set at 9.8 m/s so as to provide n·Tw=17.78 ns. The results are also shown in FIG. 5. The composition of the recording layer in this sample was selected such that recorded marks could be erased at that linear velocity. It is noted that (λ/NA)/V is 48.6 ns at a linear velocity V of 9.8 m/s.

Sample No. 3

An optical recording disk sample was fabricated as was sample No. 1 except that the composition of the recording layer was changed. This sample was measured for jitter as was sample No. 1 except that the recording linear velocity V was set at 8.1 m/s so as to provide n·Tw=21.32 ns. The results are also shown in FIG. 5. The composition of the recording layer in this sample was selected such that recorded marks could be erased at that linear velocity. It is noted that (λ/NA)/V is 58.8 ns at a linear velocity V of 8.1 m/s.

Evaluation

In FIG. 5, the jitter is in excess of 13% in the range of Tmin/(n·Tw)<0.113 because the irradiated intensity of laser beam becomes insufficient due to restrictions by the response of the laser beam emitting element. It is noted that in FIG. 5, the jitter is 10% or less when Tmin/(n·Tw)≧0.145.

It is evident from FIG. 5 that when a medium is given a rapid cooling structure under the condition that the shortest signal length n·Tw is 22 ns or less, the jitter can be reduced for Tmin/(n·Tw) within the range where no restrictions by the response of the laser beam emitting element are imposed.

Example 4

Comparison of Thermal Conductivity of Reflective Layer 5 and Second Dielectric Layer 32

Optical recording disk samples were fabricated as was sample No. 101 in Example 1 except for the following. The recording layer had the composition:

$$(R_a Te_b Sb_c)_{1-x} M_x$$

wherein M is a mixture of In and Ge in an atomic ratio of 1:6, a=0, b=0.22, c=0.78, and x=0.07. The reflective layer had a thermal conductivity $K_R$ as indicated in Table 3, and the second dielectric layer had a composition and a thermal conductivity $K_{2D}$ as indicated in Table 3. These samples were measured for jitter as in Example 1 except that the recording linear velocity V was set at 11.4 m/s (n·Tw=15.24 ns). The results are shown in Table 3.

The jitter reported in Table 3 is a minimum jitter as measured while varying the relative width Tmin/(n·Tw) of recording signal pulse. For the samples shown in Table 3, the range of Tmin/(n·Tw) where the jitter became minimum was from 0.13 to 0.2.

It is noted that sample Nos. 301 to 305 in Table 3 had a reflective layer of $Ag_{98}Pd_1Cu_1$. Sample Nos. 306 to 308 had a reflective layer of Ag—Pd whose thermal conductivity was changed by changing the Pd content. Sample No. 309 had a reflective layer of $Al_{98.4}Cr_{1.6}$.

TABLE 3

(V = 11.4 m/s, n · Tw = 15.24 ns, Tmin/(n · Tw) = 0.13–0.2)

| Sample No. | $K_R$ (W/mK) | 2nd dielectric layer Composition (mol ratio) | $K_{2D}$ (W/mK) | jitter (%) |
|---|---|---|---|---|
| 301 | 170 | $Al_2O_3$ | 44 | 8.7 |
| 302 | 170 | $Si_3N_4$ | 8 | 9.3 |
| 303 | 170 | $SiO_2$ | 1.4 | 9.8 |
| 304 | 170 | $ZnS:SiO_2$ = 50:50 | 1.0 | 10.0 |
| 305 | 170 | $ZnS:SiO_2$ = 80:20 | 0.6* | 11.0 |
| 306 | 140 | $Al_2O_3$ | 44 | 9.1 |
| 307 | 100 | $Al_2O_3$ | 44 | 9.9 |
| 308 | 90* | $Al_2O_3$ | 44 | 10.1 |
| 309 | 40* | $Al_2O_3$ | 44 | 11.0 |

*outside the preferred range

It is evident from Table 3 that when a medium is given a rapid cooling structure in which the thermal conductivity $K_R$ of the reflective layer and the thermal conductivity $K_{2D}$ of the second dielectric layer are within the preferred range, the jitter can be reduced for Tmin/(n·Tw) within the range where no restrictions by the response of the laser beam emitting element are imposed.

Example 5

Comparison of First Dielectric Layer 31 Structure

Sample No. 401

An optical recording disk sample of the structure shown in FIG. 2 was fabricated.

The reflective layer 5 was the same as in Example 1 except that the composition was $Ag_{98}Pd_1Cu_1$ (thermal conductivity 170 W/mK). The second dielectric layer 32 was the same as in Example 1 except that it was formed of $Al_2O_3$. The recording layer 4 had the composition:

$(R_aTe_bSb_c)_{1-x}M_x$ wherein M is a mixture of In and Ge in an atomic ratio of 1:5, a=0, b=0.19, c=0.81, and x=0.06. The dielectric sublayer 31C was formed of a mixture of 80 mol % ZnS and 20 mol % $SiO_2$ and 35 nm thick. The dielectric sublayer 31D was formed of $Al_2O_3$ and 100 nm thick. The light-transmitting substrate 2 was the same as in Example 1.

Sample No. 402

A sample was fabricated as was sample No. 401 except that the dielectric sublayer 31D was an aluminum nitride layer of 100 nm thick.

Sample No. 403

A sample was fabricated as was sample No. 401 except that the dielectric sublayer 31D was a silicon nitride layer of 100 nm thick.

Sample No. 404

A sample was fabricated as was sample No. 401 except that the first dielectric layer was a single layer of a mixture of 80 mol % ZnS and 20 mol % $SiO_2$ and 130 nm thick.

Evaluation

These samples were measured for jitter as in Example 1 except that the recording linear velocity V was 16.3 m/s (n·Tw=10.67 ns) and Tmin/(n·Tw) was 0.2. The results are shown in Table 4. Also shown in Table 4 are the thermal conductivity $K_{2D}$ of first dielectric layer 32, the thermal conductivity $K_C$ of dielectric sublayer 31C, and the thermal conductivity $K_D$ of dielectric sublayer 31D.

TABLE 4

(V = 16.3 m/s, n · Tw = 10.67 ns, Tmin/(n · Tw) = 0.2)

| Sample No. | $K_{2D}$ (W/mK) | $K_C$ (W/mK) | $K_D$ (W/mK) | Jitter (%) |
|---|---|---|---|---|
| 401 | 44 | 0.6 | 44 | 8.7 |
| 402 | 44 | 0.6 | 70 | 8.0 |
| 403 | 44 | 0.6 | 8 | 9.5 |
| 404 | 44 | 0.6 | (single layer) | 10.2 |

The effects achieved by setting the thermal conductivity of two dielectric sublayers of the first dielectric layer 31 within the range of the invention are evident from Table 4. In sample Nos. 401 to 403 in which the second dielectric layer 32 has a high thermal conductivity $K_{2D}$ and the first dielectric layer 31 has a structure as prescribed by the invention, the jitter is considerably small despite a very short n·Tw of 10.67 ns and a relatively large Tmin/(n·Tw) of 0.2.

Example 6

Comparison of Second Dielectric Layer 32 Thickness

Samples were fabricated as was sample No. 1 in Example 3 except that the second dielectric layer 32 of $Al_2O_3$ (thermal conductivity 44 W/mK) had a thickness as indicated in Table 5. These samples were measured for jitter as in Example 1 except that the recording linear velocity V was 11.4 m/s (n·Tw=15.24 ns) and Tmin/(n·Tw) was 0.17. The results are shown in Table 5 together with the data of sample No. 1.

TABLE 5

(V = 11.4 m/s, n · Tw = 15.24 ns, Tmin/(n · Tw) = 0.17)

| Sample No. | Second dielectric Layer thickness (nm) | Jitter (%) |
|---|---|---|
| 1 | 20 | 9.6 |
| 501 | 25 | 9.7 |
| 502 | 30 | 9.9 |

It is evident from Table 5 that the jitter falls within the acceptable range as long as the thickness of the second dielectric layer is 30 nm or less.

Example 7

Comparison of Thickness and Composition of Recording Layer 4

Optical recording disk sample Nos. 601 to 605 were fabricated as was sample No. 101 in Example 1 except for the following. The recording layer had the composition:

$(R_aTe_bSb_c)_{1-x}M_x$ wherein R is Tb, M is a mixture of In and Ge in an atomic ratio of 1:5, a=0.05, b=0.17, c=0.78, and x=0.06. The recording layer 4 had a thickness shown in Table 6. The second dielectric layer 32 was formed of $Al_2O_3$ (thermal conductivity 44 W/mK).

Optical recording disk sample Nos. 606 to 610 were similarly fabricated except that the recording layer had the composition:

$(R_aTe_bSb_c)_{1-x}M_x$ wherein M is a mixture of In and Ge in an atomic ratio of 1:6, a=0, b=0.19, c=0.81, and x=0.07, and had a thickness shown in Table 6.

These samples were recorded as was sample No. 101 except that the recording linear velocity V was 11.4 m/s (n·Tw=15.24 ns) and Tmin/(n·Tw) was 0.2. Read outputs were measured. Thereafter, the maximum linear velocity (erasable linear velocity) ensuring a erasability of at least 25 dB was measured using a dc erasing power. Sample Nos. 602 to 605 were also measured for output when read at a wavelength of 650 nm. Additionally, the samples were measured for cross-erasing. The results are shown in Table 6. The read outputs indicated in Table 6 are standardized on the basis of read outputs from the recording layer of 15 nm thick.

TABLE 6

(V = 11.4 m/s, n · Tw = 15.24 ns, Tmin/(n · Tw) = 0.2)

| Sample No. | Recording Layer thickness (nm) | Erasable linear velocity (m/s) | Read output (at λ = 405 nm) | Read output (at λ = 650 nm) | Cross-erasing (dB) |
|---|---|---|---|---|---|
| 601 | 4* | unrecordable | — | — | — |
| 602 | 6 | 10.0 | 1.15 | 0.55 | −0.1 |
| 603 | 9 | 20.0 | 1.14 | 1.01 | −0.5 |
| 604 | 12 | 23.0 | 1.19 | 1.05 | −0.9 |
| 605 | 15 | 25.0 | 1 | 1 | −2.0 |
| 606 | 4* | unrecordable | — | — | — |
| 607 | 6 | 6.5 | 0.74 | — | −0.2 |
| 608 | 9 | 9.5 | 0.89 | — | −0.6 |
| 609 | 12 | 12.0 | 0.92 | — | −0.7 |
| 610 | 15 | 12.0 | 1 | — | −0.9 |

*outside the preferred range

It is evident from Table 6 that the addition of Tb to the recording layer accelerates the erasable linear velocity and prevents the read output from lowering when the recording layer is made thin. On use of the recording/reading wavelength of 405 nm, the drop of read output when the recording layer is made thin is significantly small as compared with the recording/reading wavelength of 650 nm. The recording layer with Tb added suppresses cross-erasing when it is made thin. It is noted that samples having a recording layer in which Dy or Gd was added instead of Tb were fabricated and similarly tested, finding equivalent results to the addition of Tb.

Example 8

Comparison of Composition of Recording Layer 4

Optical recording disk samples were fabricated as was sample No. 101 in Example 1 except that the recording layer had the composition:

$(R_aTe_bSb_c)_{1-x}M_x$ wherein R is Tb, x=0, a, b and c are as indicated in Table 7, and the second dielectric layer 32 was formed of $Al_2O_3$ (thermal conductivity 44 W/mK). As in Example 7, these samples were examined for read output and erasable linear velocity. For each sample, the crystallization temperature of the recording layer was measured. The results are shown in Table 7.

TABLE 7

(V = 11.4 m/s, n · Tw = 15.24 ns, Tmin/(n · Tw) = 0.2)

| Sample No. | a | b | c | a/b | a/c | Erasable Linear velocity (m/s) | Read output (mV) | Crystallization temp. (° C.) |
|---|---|---|---|---|---|---|---|---|
| 701 | 0.050 | 0.650 | 0.300* | 0.08 | 0.17 | unrecordable | — | — |
| 702 | 0* | 0.502 | 0.498 | 0 | 0 | <1 | 320 | 130 |
| 703 | 0.074 | 0.460 | 0.466 | 0.16 | 0.16 | 1 | 250 | 170 |
| 704 | 0.155 | 0.398 | 0.447 | 0.39 | 0.35 | 2 | 226 | 196 |
| 705 | 0.237 | 0.336 | 0.427 | 0.71 | 0.56 | 12 | 128 | 205 |
| 706 | 0.317 | 0.276 | 0.407 | 1.15 | 0.78* | unrecordable | — | — |
| 707 | 0* | 0.441 | 0.559 | 0 | 0 | <2 | 354 | 130 |
| 708 | 0.074 | 0.384 | 0.542 | 0.19 | 0.14 | 2 | 254 | 175 |
| 709 | 0.131 | 0.344 | 0.525 | 0.38 | 0.25 | 12 | 154 | 197 |
| 710 | 0.218 | 0.273 | 0.509 | 0.80 | 0.43 | 3 | 100 | 205 |
| 711 | 0.281 | 0.230 | 0.489 | 1.22* | 0.57 | unrecordable | — | — |
| 712 | 0* | 0.345 | 0.655 | 0 | 0 | 2 | 400 | 135 |
| 713 | 0.073 | 0.286 | 0.641 | 0.26 | 0.11 | 11.4 | 266 | 180 |
| 714 | 0.113 | 0.264 | 0.623 | 0.43 | 0.18 | 23 | 170 | 200 |
| 715 | 0.152 | 0.243 | 0.605 | 0.63 | 0.25 | 6.5 | 146 | 210 |
| 716 | 0.230 | 0.185 | 0.585 | 1.24* | 0.39 | unrecordable | — | — |
| 717 | 0* | 0.250 | 0.750 | 0 | 0 | 16.3 | 348 | 140 |
| 718 | 0.074 | 0.203 | 0.723 | 0.36 | 0.10 | 25 | 230 | 182 |

TABLE 7-continued (V = 11.4 m/s, n · Tw = 15.24 ns, Tmin/(n · Tw) = 0.2)

| Sample No. | a | b | c | a/b | a/c | Erasable Linear velocity (m/s) | Read output (mV) | Crystallization temp. (° C.) |
|---|---|---|---|---|---|---|---|---|
| 719 | 0.146 | 0.156 | 0.698 | 0.94 | 0.21 | 10 | 122 | 205 |
| 720 | 0.191 | 0.127 | 0.682 | 1.50* | 0.28 | unrecordable | — | — |
| 721 | 0* | 0.150 | 0.850 | 0 | 0 | 23 | 310 | 147 |
| 722 | 0.073 | 0.092 | 0.835 | 0.79 | 0.09 | 25 | 200 | 187 |
| 723 | 0.132 | 0.058 | 0.810 | 2.28* | 0.16 | unrecordable | — | — |

*outside the preferred range

It is evident from Table 7 that the addition of rare earth element is effective for raising the crystallization temperature of the recording layer and improving the storage reliability thereof. By controlling the composition such that all of c, a/b and a/c fall within the specific ranges, satisfactory read outputs are produced and the erasing at a high linear velocity is possible.

Example 9

Comparison of Groove Depth

Samples were fabricated as was sample No. 1 in Example 3 except that the groove depth as expressed by optical path length was changed as shown in Table 8. For these samples, recording was done at a linear velocity V of 11.4 m/s (n·Tw=15.24 ns) and Tmin/(n·Tw)=0.17. On reading, cross-erasing and cross-talk were measured. The results are shown in Table 8 together with the data of sample No. 1.

TABLE 8

(V = 11.4 m/s, n · Tw = 15.24 ns, Tmin/(n · Tw) = 0.17)

| Sample No. | Groove depth (optical path length) | Cross-erasing (dB) | Cross-talk (dB) |
|---|---|---|---|
| 801 | λ/4 | 0 | 23 |
| 802 | λ/5 | 0 | 25 |
| 1 | λ/6 | 0 | 28 |
| 803 | λ/7 | −0.3 | 24 |
| 804 | λ/8 | −1 | 21 |

It is evident from Table 8 that both the cross-erasing and cross-talk can be reduced by setting the groove depth as expressed by optical path length in the range of λ/7 to λ/5.

Japanese Patent Application Nos. 2000-139538, 2000-241510, 2000-270339 and 2001-109137 are incorporated herein by reference.

Reasonable modifications and variations are possible from the foregoing disclosure without departing from either the spirit or scope of the present invention as defined by the claims.

What is claimed is:

1. An optical recording method for recording information in an optical recording medium having a recording layer by irradiating a laser beam thereto through an optical system, wherein
provided that the laser beam has a wavelength λ, the optical system includes an objective lens having a numerical aperture NA, the window margin is Tw, and a signal length corresponding to the shortest recorded mark is n·Tw, the recording is carried out under the conditions:

$\lambda/NA \leq 680$ nm, and $n·Tw \leq 22$ ns.

2. The optical recording method of claim 1 wherein provided that the laser beam used to form the shortest recorded mark has an emission time Tmin, the recording is carried out under the condition:

$0.113 \leq Tmin/(n·Tw) \leq 1.0$.

3. The optical recording method of claim 1 wherein said recording layer is a phase change recording layer.

4. The optical recording method of claim 1 wherein the recording is carried out at a linear velocity V which satisfies the condition:

$(\lambda/NA)/V \leq 60$ ns.

5. The optical recording method of claim 1 wherein said optical recording medium includes the recording layer, a dielectric layer, and a reflective layer stacked in the order from closer to remoter one as viewed from the incident side of the recording laser beam,
the reflective layer has a thermal conductivity $K_R$ of at least 100 W/mK, and the dielectric layer disposed between the recording layer and the reflective layer has a thermal conductivity $K_{2D}$ of at least 1 W/mK.

6. The optical recording method of claim 1 wherein said optical recording medium includes a light-transmitting substrate, a dielectric layer, and the recording layer stacked in the order from closer to remoter one as viewed from the incident side of the recording laser beam, wherein
the dielectric layer disposed between the light-transmitting substrate and the recording layer includes at least two dielectric sublayers, of which two dielectric sublayers having different thermal conductivity are contiguous to each other,
one of the two dielectric sublayers which is disposed close to the recording layer has a thermal conductivity $K_C$, and the other of the two dielectric sublayers which is disposed remote from the recording layer has a thermal conductivity $K_D$ wherein $K_C < K_D$.

7. The optical recording method of claim 1 wherein the recording layer is represented by an atomic ratio composition:

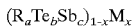

$(R_aTe_bSb_c)_{1-x}M_x$ wherein R denotes rare earth elements, Te is tellurium, Sb is antimony, and M denotes constituent elements excluding R, Te and Sb, and letters a, b, c and x satisfy:

a+b+c=1, a>0, 0.4≦c≦0.95, a/b≦1.2, a/c≦0.7, and

0≦x≦0.1.

8. An optical recording medium comprising a phase change recording layer represented by an atomic ratio composition:

$$(R_a Te_b Sb_c)_{1-x} M_x$$

wherein R denotes rare earth elements, Te is tellurium, Sb is antimony, and M denotes constituent elements excluding R, Te and Sb, and letters a, b, c and x satisfy:

a+b+c=1, a>0, 0.4≦c≦0.95, a/b≦1.2, a/c≦0.7, and

0≦x≦0.1.

9. The optical recording medium of claim 8 wherein said optical recording medium includes the recording layer, a dielectric layer, and a reflective layer stacked in the order from closer to remoter one as viewed from the incident side of a recording laser beam, the reflective layer has a thermal conductivity $K_R$ of at least 100 W/mK, and the dielectric layer disposed between the recording layer and the reflective layer has a thermal conductivity $K_{2D}$ of at least 1 W/mK.

10. The optical recording medium of claim 8 wherein said optical recording medium includes a light-transmitting substrate, a dielectric layer, and the recording layer stacked in the order from closer to remoter one as viewed from the incident side of the recording laser beam, wherein the dielectric layer disposed between the substrate and the recording layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C<K_D$.

11. An optical recording medium comprising a phase change recording layer, a dielectric layer, and a reflective layer stacked in the described order as viewed from the incident side of a recording laser beam, wherein the reflective layer has a thermal conductivity $K_R$ of at least 100 W/mK, and the dielectric layer disposed between the recording layer and the reflective layer has a thermal conductivity $K_{2D}$ of at least 1 W/mK.

12. The optical recording medium of claim 11 further comprising another dielectric layer disposed in front of the recording layer as viewed from the incident side of a recording laser beam, the other dielectric layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C<K_D$.

13. An optical recording medium comprising a light-transmitting substrate, a dielectric layer, and a phase change recording layer stacked in the order from closer to remoter one as viewed from the incident side of a recording laser beam, wherein the dielectric layer disposed between the substrate and the recording layer includes at least two dielectric sublayers, of which two dielectric sublayers having different thermal conductivity are contiguous to each other, one of the two dielectric sublayers which is disposed close to the recording layer has a thermal conductivity $K_C$, and the other of the two dielectric sublayers which is disposed remote from the recording layer has a thermal conductivity $K_D$ wherein $K_C<K_D$.

* * * * *